United States Patent
Rothenbuhler

(10) Patent No.: US 10,081,472 B2
(45) Date of Patent: Sep. 25, 2018

(54) RECLOSABLE PACKAGING

(71) Applicant: Amcor Flexibles Burgdorf GmbH, Burgdorf (CH)

(72) Inventor: Martin Rothenbuhler, Langnau i.E. (CH)

(73) Assignee: Amcor Flexibles Burgdorf GmbH, Burgdorf (CH)

( * ) Notice: Subject to any disclaimer, the term of this patent is extended or adjusted under 35 U.S.C. 154(b) by 0 days.

(21) Appl. No.: 15/552,096

(22) PCT Filed: Feb. 15, 2016

(86) PCT No.: PCT/EP2016/053102
§ 371 (c)(1),
(2) Date: Aug. 18, 2017

(87) PCT Pub. No.: WO2016/131741
PCT Pub. Date: Aug. 25, 2016

(65) Prior Publication Data
US 2018/0044089 A1    Feb. 15, 2018

(30) Foreign Application Priority Data
Feb. 20, 2015   (EP) ..................................... 15155978

(51) Int. Cl.
*B65D 75/58*   (2006.01)
*B65D 77/20*   (2006.01)
(Continued)

(52) U.S. Cl.
CPC ............ *B65D 75/5833* (2013.01); *B32B 7/06* (2013.01); *B32B 7/14* (2013.01); *B32B 15/08* (2013.01);
(Continued)

(58) Field of Classification Search
CPC ............ B65D 75/5833; B65D 77/2096; B65D 2575/586; B65D 77/2056;
(Continued)

(56) References Cited

U.S. PATENT DOCUMENTS 2,884,126 A      4/1959   Ulrich
2005/0276525 A1  12/2005  Hebert et al.
2008/0274420 A1  11/2008  Song et al.

FOREIGN PATENT DOCUMENTS

EP    0 191 003 A1   8/1986
EP    0 193 130 A2   9/1986
(Continued)

OTHER PUBLICATIONS

Czech, Z.; Crosslinking of pressure sensitive adhesive based on water-borne acrylate, Polymer International; vol. 52, No. 3, Feb. 17, 2003; pp. 347-357.

*Primary Examiner* — Michael C Miggins
(74) *Attorney, Agent, or Firm* — Reinhart Boerner Van Deuren P.C.

(57) ABSTRACT

The present invention is related to a flexible laminate for forming a reclosable packaging container comprising a built-in opening and reclose feature, said laminate comprising an inner structure and an outer structure, adhesively joined face-to-face, the outer structure forming the outer surface of the container and the inner structure forming the inner surface of the container, the outer structure comprising an outer flap portion delimited by a scoring line through the outer structure, and an inner structure comprising an inner flap portion delimited by a scoring line through the inner structure, the inner score line and the outer score line creating an opening into the container when the flap portions are peeled back, a marginal region of the outer flap portion extending beyond an edge of the inner flap portion and overlying an underlying surface of the inner structure, the (Continued)

inner and outer flap portions being joined in a second adhesive region and the first adhesive region being disposed between the marginal region of the outer flap portion and the underlying surface of the inner structure for attaching and re-attaching, in use, the outer flap portion to the underlying surface, wherein the bond/peel strength, measured according to ASTM F904-1998 (reapproved 2008), of the first adhesive region is smaller than the bond/peel strength of the second adhesive, the first adhesive being permanently tacky and covering the entire surface of either the inner structure or the outer structure, said first adhesive being patterned covered by an adhesion promoter, transforming said first adhesive into a second adhesive and creating patterns of first adhesive region and second adhesive region.

27 Claims, 4 Drawing Sheets

(51) Int. Cl.
- *B32B 27/36* (2006.01)
- *B32B 27/34* (2006.01)
- *B32B 27/30* (2006.01)
- *B32B 27/16* (2006.01)
- *B32B 15/20* (2006.01)
- *B32B 15/08* (2006.01)
- *B32B 7/14* (2006.01)
- *B32B 7/06* (2006.01)
- *B32B 38/04* (2006.01)

(52) U.S. Cl.
CPC .............. *B32B 15/20* (2013.01); *B32B 27/16* (2013.01); *B32B 27/306* (2013.01); *B32B 27/34* (2013.01); *B32B 27/36* (2013.01); *B32B 38/04* (2013.01); *B65D 77/2056* (2013.01); *B65D 77/2096* (2013.01); *B32B 2038/042* (2013.01); *B32B 2255/205* (2013.01); *B32B 2307/31* (2013.01); *B32B 2307/4023* (2013.01); *B32B 2307/514* (2013.01); *B32B 2307/546* (2013.01); *B32B 2307/726* (2013.01); *B32B 2307/744* (2013.01); *B32B 2307/748* (2013.01); *B32B 2439/40* (2013.01); *B65D 2575/586* (2013.01)

(58) Field of Classification Search
CPC ... B32B 2038/042; B32B 38/04; B32B 27/36; B32B 27/34; B32B 27/306; B32B 27/16; B32B 15/20; B32B 15/08; B32B 7/14; B32B 7/06; B32B 2439/40; B32B 2307/748; B32B 2307/744; B32B 2307/726; B32B 2307/546; B32B 2307/514; B32B 2307/4023; B32B 2307/31; B32B 2255/205
See application file for complete search history.

(56) References Cited

FOREIGN PATENT DOCUMENTS

| EP | 0 904 853 A2 | 3/1999 |
|---|---|---|
| EP | 0 957 045 A1 | 11/1999 |
| EP | 1 375 617 A1 | 1/2004 |
| EP | 1 449 789 A1 | 8/2004 |
| EP | 2 243 716 A1 | 10/2010 |
| EP | 2 257 479 A1 | 12/2010 |
| EP | 2 323 921 A1 | 5/2011 |
| EP | 2 347 972 A1 | 7/2011 |
| WO | WO 98/22367 | 5/1998 |
| WO | WO 00/34008 | 6/2000 |
| WO | WO 2004/009720 A3 | 1/2004 |
| WO | WO 2005/123535 A1 | 12/2005 |
| WO | WO 2008/062159 A1 | 5/2008 |
| WO | WO 2008/115693 A1 | 9/2008 |
| WO | WO 2009/111153 A1 | 9/2009 |
| WO | WO 2010/002834 A1 | 1/2010 |
| WO | WO 2010/080810 A1 | 7/2010 |
| WO | WO 2011/032064 A1 | 3/2011 |
| WO | WO 2011/069575 A1 | 6/2011 |
| WO | WO 2011/110272 A1 | 9/2011 |
| WO | WO 2013/048934 A1 | 4/2013 |
| WO | WO 2014/186169 A1 | 11/2014 |
| WO | WO 2016/131740 A1 | 8/2016 |
| WO | WO 2016/131742 A1 | 8/2016 |

RECLOSABLE PACKAGING

FIELD OF THE INVENTION

The present invention is related to reclosable packaging containers comprising a flexible laminate with a built-in opening and reclose arrangement, and to a method for the production of this flexible laminate.

STATE OF THE ART

Flexible packaging materials are used in many applications and obtained by various form fill and seal technologies using laminates of specific constitutions, generally tailormade for their specific applications.

Flexible laminates are well known in the flexible packaging industry. The laminates are usually obtained by adhesive laminations of one or more polymer films comprising lacquers, barrier layer and metallisation layer, etc. with other possible layers such as paper, metal foils, and the like. The polymer layer may be extruded, coextruded and/or joined by permanent adhesive (PA) and/or pressure-sensitive adhesive (PSA), to the final laminate.

Flexible packages often contain products that may be used progressively over a longer period of time. If the package is not reclosable, the products are susceptible to premature aging because they are exposed to the moisture of the surrounding environment. It is therefore important to be able to correctly reclose a package after its initial opening to keep the product that remains in the package fresh.

Various built-in opening and reclose arrangements have been developed for flexible packaging containers in the last decades.

The built-in opening and reclose systems of the prior art are obtained by specific score lines performed on both sides of the flexible laminate and delimiting adhesive pattern configurations. Each of those configurations has specific advantages and drawbacks.

Nakamura discloses in EP 0 193 130 (1986) one of the first built-in opening and reclose structures in a laminate.

Alusuisse discloses in EP-A1-0 957 045 (1999) a packaging with a built-in opening and reclose flap obtained by a laminate comprising pattern-applied permanent and pressure-sensitive adhesives in register. The laminate comprises an outer structure and an inner structure. The outer structure comprises a barrier layer. The pressure-sensitive adhesive can be positioned on the inner or outer structure. The permanent and the pressure-sensitive adhesives are both applied on the same inner or outer structure and the score lines are performed separately on the inner structure and on the outer structure of the laminate.

Alcan discloses in EP-A1-1449 789 (2004) a packaging with a built-in opening and reclose flap obtained by a laminate comprising an outer structure and an inner structure. In a first embodiment, the laminate comprises pattern-applied, permanent and pressure-sensitive adhesives in register, and in a second embodiment a permanent adhesive is applied on the entire surface on the first structure of the laminate and a pattern-applied pressure-sensitive adhesive on the second structure of laminate. In this case, the permanent adhesive and the pressure-sensitive adhesives are superimposed where the PSA is pattern applied and creates a local detrimental increase of thickness entailing a deformation of the produced reel of the laminate. The disclosed outer and inner structures may comprise a series of layers, among them a barrier layer. The pressure-sensitive adhesive can be positioned on the inner or on the outer structure. The permanent adhesive and the pressure-sensitive adhesive are both applied separately on the first and second structures of the laminate. The score lines are performed separately on the inner and outer structures before the structures are joined face to face and form the laminate.

Sonoco discloses in WO 2005/123535 A1 (2005) a packaging with a built-in opening and reclose flap obtained by a laminate comprising pattern-applied, permanent and pressure-sensitive adhesives in register. The permanent adhesive does not cover the pressure-sensitive adhesive. The laminate comprises an outer structure and an inner structure, the inner structure comprises a seal layer and a barrier layer, in particular a metallized polymer layer that is able to reflect a laser beam possibly used to perform the score lines. The pressure-sensitive adhesive remains positioned on the flap after a first opening. The permanent adhesive and the pressure-sensitive adhesives are both applied in register on the same first or second structure of the laminate and the score lines are performed on the finished laminate after the inner and outer structures of the laminate are joinded.

Sonoco, in a divisional application EP-A1-2 243 716 of WO 2005/123535 A1, claims the replacement of the permanent adhesive by a pressure-sensitive adhesive, wherein the first and second structures of the laminate are joined by a pressure-sensitive adhesive layer without the use of any permanent adhesive.

Wrigley in WO 2008/115693 A1 (2008) discloses a method for making a flexible built-in opening and reclose feature in a laminate comprising pattern-applied permanent adhesive and a strip of pressure-sensitive adhesive in register in the marginal region between the score lines. The laminate comprises a first structure and a second structure. The first structure is independently scored before joining the second structure and forming a laminate. The second score line is then performed on the laminate.

Printpack Illinois discloses in WO 2010/080810 A1 a reclosable container with built-in opening and reclose feature based on the inner and outer sides of a laminate with a resealable cover portion and a pressure-sensitive adhesive affixing the inner side to the outer side. Here, the basic difference compared to the mentioned prior art before 2010 is that the permanent adhesive is replaced by a heat seal.

Avery Dennison in WO 2011/032064 (2011) discloses a resealable packaging laminate with a built-in opening and reclose arrangement comprising an outer and an inner laminate portions. The outer and inner score lines are arranged to define a marginal region comprising a pressure-sensitive adhesive at least partly in contact with a release layer positioned on the inner layer.

Hochland in EP 2 347 972 A1 (2011) discloses a reclosable packaging, in particular a lid for a tray, with a built-in opening and reclose arrangement comprising a rupturable weakening line in the lid. The lid is obtained by a laminate comprising permanent adhesive in the central area of the lid and pressure-sensitive adhesive in the border area of the lid. The outer structure comprises among other possible layers a barrier layer.

Other laminates, specifically related to cigarette-pack inner or outer wrapper comprising similar built-in opening and reclose arrangements are disclosed by BAT in WO 98/22367 and WO 2008/062159 or by Focke in WO 2011/069575 and WO 2011/110272.

Sonoco in EP 2 257 479 B1 discloses a flexible packaging laminate having built-in opening/reclose and tamper-evidence features by forming the laminate from an outer structure joined in face-to-face relation to an inner structure. Score lines are formed in both structures to enable an opening to be formed through the laminate by lifting a flap out of the plane of the laminate. The score line through the outer structure defines a larger opening than the score line through the inner structure, such that a marginal region of the outer structure extends beyond the edge of the opening portion of the inner structure. A pressure-sensitive adhesive is used to re-adhere the marginal region to an underlying surface of the inner structure adjacent the opening through the laminate. The outer score line includes at least one tear portion that is torn through upon initial opening, thus indicating the package has been at least partially opened.

Avery Dennison in EP 2 323 921 B1 discloses a resealable container having an easily accessed yet airtight seal via the use of a tamper-evident rupture strip which provides the container or package with improved shelf life for the product contained therein.

None of the prior art documents uses a permanently tacky adhesive covered by an adhesion promotor (without chemical reaction) transforming said permanent tacky adhesive into a permanent adhesive for the outer layer in contact with said adhesive.

AIM OF THE INVENTION

The present invention aims to provide an alternative to the existing packages with built-in opening and reclose feature and a method for the production of the laminate presenting specific advantages over the above-mentioned prior art.

SUMMARY OF THE INVENTION

The present invention discloses a flexible laminate for forming a reclosable packaging container comprising a built-in opening and reclose feature, said laminate comprising an inner structure and an outer structure, adhesively joined face-to-face, the outer structure forming the outer surface of the container and the inner structure forming the inner surface of the container, the outer structure comprising an outer flap portion delimited by a scoring line through the outer structure, and an inner structure comprising an inner flap portion delimited by a scoring line through the inner structure, the inner score line and the outer score line creating an opening into the container when the flap portions are peeled back, a marginal region of the outer flap portion extending beyond an edge of the inner flap portion and overlying an underlying surface of the inner structure, the inner and outer flap portions being joined in a second adhesive region and the first adhesive region being disposed between the marginal region of the outer flap portion and the underlying surface of the inner structure for attaching and re-attaching, in use, the outer flap portion to the underlying surface, wherein the bond/peel strength, measured according to ASTM F904-1998 (reapproved 2008), of the first adhesive region is smaller than the bond/peel strength of the second adhesive, the first adhesive being permanently tacky and covering the entire surface of either the inner structure or the outer structure, said first adhesive being patterned covered by an adhesion promoter, transforming said first adhesive into a second adhesive and creating patterns of first adhesive region and second adhesive region.

Preferred embodiments of the present invention disclose one or more of the following features:
the bond/peel strength of the second adhesive region is at least 0.5 N/15 mm, preferably 1.0 N/15 mm, and more preferably 1.5 N/15 mm, higher than the bond/peel strength of the first adhesive region, measured according to a T-peel geometry at a speed of 100 mm/min and room temperature;
the bond/peel strength of the first adhesive region (2) should be lower than 1.3 N/15 mm, preferably lower than 1.1 N/15 mm, more preferably lower than 0.9 N/15 mm, and the bond/peel strength obtained in the second adhesive region should be higher than 1.5 N/15 mm, preferably higher than 1.6 N/15 mm, more preferably higher than 1.8 N/15 mm, and can be higher than 3.0 N/15 mm, where the peel force represents the tear strength of one of the structure layers, the values being measured according to a T-peel geometry at a speed of 100 mm/min and room temperature;
the adhesive comprises one or more (meth)acrylate copolymers or one or more polyurethane resins;
the adhesion promoter is a copolymer of at least one C2-C20 alkene and at least one $\alpha,\beta$-monoethylenically unsaturated mono- or dicarboxylic acid or vinyl acetate;
the adhesion promoter is a copolymer comprising:
from 20 to 95% by weight, preferably 40 to 90% by weight, more preferably from 70 to 90% by weight, of at least one C2-C20, preferably C2-C10, more preferably C2-C4-olefin; and
from 5 to 80% by weight, preferably from 10 to 60% by weight, more preferably from 10 to 30% by weight, of at least one monomer selected from the group consisting of $\alpha,\beta$-mono-ethylenically unsaturated C3-C8-monocarboxylic acids, $\alpha,\beta$-monoethylenically unsaturated C4-C8-dicarboxylic acids, the anhydrides of these mono- and dicarboxylic acids and vinylacetate;
the adhesion promoter is an ethylene acrylic acid copolymer or an ethylene vinyl acetate copolymer;
one of the inner or outer structures of the laminate comprises an adhesive-free region adjacent to the first adhesive region to create an opening-initiation zone;
one of the outer or inner structures has a greater affinity for bonding to the adhesive of the first adhesive region such that the adhesive remains entirely with one of the outer or inner structures when the flap portions are peeled back;
the outer structure includes a layer that is reverse-printed on a surface of the layer facing the inner structure;
the inner structure includes a barrier layer providing a barrier against passage of at least one of moisture and oxygen;
the outer structure comprises a layer of polyethylene terephthalate or oriented polypropylene and the inner structure comprises:
a multi-layer web comprising a metallized polymer film, preferably a metallized oriented polypropylene and a heat-sealable material or,
a heat-sealable multilayer web, preferably a heat-sealable metallized oriented polypropylene.

The present invention further discloses a reclosable packaging comprising the flexible laminate.

The present invention further discloses a method for making the flexible multilayer laminate, said method comprising the steps of:
applying a layer of first permanently tacky adhesive onto one surface of the inner or outer structure;
patterned contacting said first adhesive and creating patterns of first and second region, the first adhesive region having a lower bond/peel strength than the second adhesive region and the first adhesive region being permanently tacky;

scoring the inner and outer structures by a scoring station before or after adhesively joining the inner structure to the outer structure face to face to form the laminate, an outer score line being formed through the thickness of the outer structure in registration with the outer perimeter of the first adhesive region, and an inner score line being formed through the thickness of the inner structure in registration with the inner perimeter of the first adhesive region.

Preferred embodiments of the method for making the flexible laminate of the present invention disclose at least one or a combination of the following steps:

the second adhesive region and the first adhesive region are patterned, wherein the position of the opening initiation is covered by a release layer or wherein the position of the opening initiation is adhesive-free;

the patterned conversion of first adhesive into second adhesive, in the second adhesive region, is obtained through the patterned contacting one or more adhesion promoters to the first adhesive in the second adhesion region;

treating one surface of the outer or inner structure with a corona or flame treatment to increase the bonding affinity with the first adhesive region such that the first adhesive tends to remain adhered to the treated surface when the opening portions are peeled back.

KEY

Figure 1:
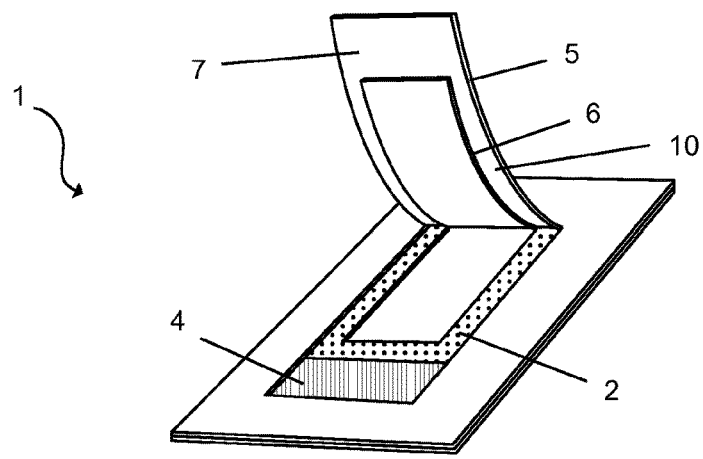
FIG. 1 is a view of the built-in opening and reclose feature with a first adhesive region surrounding the opening and a release-coating region or adhesive-free region, the permanently tacky adhesive remaining on the inner structure of the laminate after opening.

1. Built-in opening and reclose feature
2. First adhesive region (lower bond/peel strength) and permanently tacky
3. Second adhesive region (higher bond/peel strength) comprising an adhesive promotor layer superposed on the permanently tacky adhesive
4. Release-coating layer for the opening initiation
5. Scoring line of the outer structure
6. Scoring line of the inner structure
7. Opening initiation in deactivated region (dead zone)
8. Outer structure of the laminate
9. Inner structure of the laminate
10. Marginal region
11. Barrier layer
12. Adhesion promoter layer
13. Release layer applicator
14. Adhesive applicator
15. Oven
16. Adhesion promoter applicator
17. Scoring station (laser, kiss cutting . . . ) with eye mark/scoring coordination

DESCRIPTION OF THE INVENTION

The present invention discloses a flexible laminate structure suitable for forming a packaging container having a built-in opening and reclose feature 1, the laminate comprising a two-part structure, namely an outer structure 8 joined in face-to-face relation with an inner structure 9. The adjectives "inner" and "outer" are related to the position in the packaging container, the inner structure 9 being in contact with the content of the packaging container and the outer structure 8 being in contact with the environment. Inner and outer structures can also be named first and second structures of the laminate.

In general, the inner and outer structures are joined by means of adhesives, wherein the adhesive strength of the adhesive used for the reclosable built-in opening is different from the adhesive strength of the adhesive used for the remainder of the flexible laminate structure.

In the prior art, the concept of "differential adhesion strength" on various substrates is always expressed as a binary terminology, referring to a "permanent adhesive" and a "pressure-sensitive adhesive".

In general, a pressure-sensitive adhesived structure is defined as a separable structure without breaking or rupturing any layer when peeling the structure. A permanent adhesived structure on the other hand is not separable without breaking or rupturing any layer when peeling the structure.

Yet, the terminology "pressure-sensitive adhesive" is jargon, commonly used and accepted in the industrial world, which actually is erroneous since basically all adhesives are pressure-sensitive. The terminology that would have to be used in order to designate the so-called "pressure-sensitive adhesives" is "permanent tacky adhesives" since the latter adequately and properly expresses their characteristics. Such a permanently tacky adhesive can be used for repeatedly de-attaching and attaching different substrates such as an inner and an outer structure of a flexible laminate structure.

Likewise, the terminology "permanent adhesive" cannot be considered as an absolute concept; whether an adhesive is permanent or not will depend on various factors such as type of substrate, application method, temperature and ageing among others.

Because the expressions "permanent adhesives" and "pressure-sensitive adhesives" are not totally representative for the real life situations and because transition states between both may exist, the present invention uses the terminology "first adhesive" and "second adhesive" wherein the bond/peel strength of the second adhesive is higher than the bond/peel strength of the first adhesive. Likewise, the regions where this adhesives are present are qualified as "first adhesive region" and "second adhesive region".

Within the context of the present invention, the term "first adhesive" stands for an adhesive with a first bond/peel strength and which is permanently tacky, while the term "second adhesive" stands for an adhesive with a second bond/peel strength, wherein the first bond/peel strength is lower than the second bond/peel strength, the difference between both being at least 0.5 N/15 mm measured according to a T-peel geometry at a speed of 100 mm/min and room temperature.

The peel strength tests were inspired by ISO 11339, using a T-peel geometry, at room temperature. The tests were performed using an Instron™ tensile machine with a crosshead speed of 100 mm/min. The width of the tested strips was 15 mm, and the results are reported in N/15 mm. The sample is cut perpendicular to the extrusion direction.

With permanent tacky, the present invention means that the bond peel/strength after five consecutive de-attaching/attaching cycles does not decrease by more than 75%, preferable by not more than 60%, more preferably by not more than 50% or even not more than 40%, of its initial value. It is obvious that the bond/peel strength values obtained in such tests is, for one type of first adhesive, dependent of the time interval between each de-attaching/attaching cycle, the pressure applied for re-attaching the flap, temperature at which the test is performed, the size of the marginal region 10 and the thickness of the first adhesive in the first adhesive region, among others. In the present invention, the flexible laminate is stored at room temperature for the whole test and the test is repeated in intervals of one hour. The pressure for re-attaching the flap is exerted by pushing the thumb and forefinger against each other.

Although the rupture of facing layers largely depends on their tear strength, it is generally admitted within the context of the present invention that the bond/peel strength obtained by the first permanently tacky adhesive should be lower than 1.3 N/15 mm, preferably lower than 1.1 N/15 mm, more preferably lower than 0.9 N/15 mm, to avoid rupturing the facing layer.

The second adhesive cannot be used for opening and reclose features. The bond/peel strength obtained by the second adhesive should be higher than 1.50 N/15 mm, preferably higher than 1.6 N/15 mm, more preferably higher than 1.8 N/15 mm, and can be as high as 3.0 N/15 mm, where the peel force represents in fact the tear strength of one of the layers. The second adhesive has no permanent tackiness.

Within the context of the present invention, the second adhesive is obtained from contacting the first adhesive with a thin adhesion promoter layer superimposed on the permanent tacky adhesive (first adhesive).

According to the present invention, a "first region" means a region comprising a first adhesive having a first bond/peel strength and a "second region" means a region comprising a second adhesive with a second bond/peel strength wherein the second region 3 is obtained from a patterned contacting the first adhesive with adhesion promoter.

The first adhesive is applied over the entire surface (except possibly on the opening initiation area) of the inner structure 9 and one or more adhesion promoters are pattern contacted to the first adhesive forming the second adhesive region 3, wherein the first adhesive is converted into the second adhesive.

Figure 7:
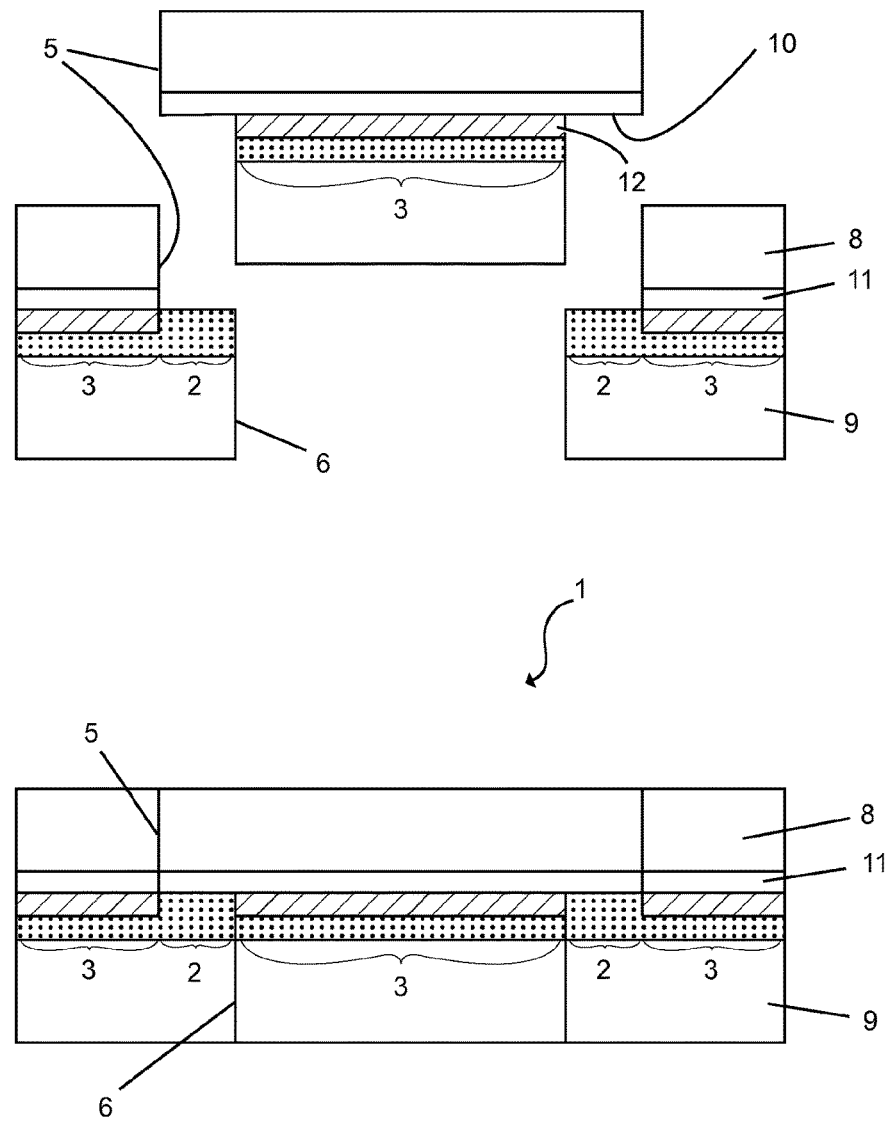
FIG. 7 represents a profile view of the built-in opening and reclose feature in open and closed positions. In this particular case, the precursor transformation into the high bond/peel strength region 3 was performed on the side of the outer structure but this transformation can also be contemplated on the side of the inner structure (not represented).

The second adhesive region 3 thus comprises a layer of first adhesive, in contact with the outer layer of the inner structure 9 and a layer of second adhesive in contact with the inner layer of the outer structure 8 which is preferably a metalized layer or a metal layer (see FIG. 7).

The patterned contacting of the first adhesive with one or more adhesion promoters implies that second adhesive-free regions, i.e. first adhesive regions 2, are formed enabling the opening and reclose feature of the reclosable flap. Further, a release coating preferably is applied on top of the first adhesive at patterns corresponding to the opening initiation of the reclosable flap, in order to facilitate the opening. On the other hand, patterns corresponding to opening initiation are kept adhesive-free when applying the first adhesive.

The preferred embodiment thus results in an inner structure entirely covered with first adhesive optionally except at the location of the opening initiation.

At least one of both structures (8, 9) comprises the first adhesive on its surface. The patterned conversion of the first adhesive into the second region 3 is performed on request before or after joining both structures (8, 9).

The inner and outer structures (8, 9) of the laminate include usual lamination structures. The outer structure generally exhibits a printable polymer layer, sometimes associated to a paper layer. Reverse printing is often preferred. Barrier layer 11 such as oriented polyamide (OPA) or ethylene vinyl alcohol copolymer (EVOH), aluminium foils and the like are usual constituents. The inner structure 9 often comprises a polyolefin seal layer, sometimes associated to support layer, among them oriented polymers like OPP, OPA, OPET, . . . Substantially all combinations are possible and well known by those skilled in the art.

The number of constituents of a laminate are mainly governed by their specific function in the laminate, by lamination facilities and by price considerations. Technically, almost all combinations are possible.

A score line, defined here as a line of weakness or a trough cut, is formed in the outer structure (outer score line 5) to define an outer opening portion and an inner line of weakness or a trough cut is formed in the inner structure (inner score line 6) to define an inner opening portion. The outer and inner opening portions are attached to each other in a second adhesive region 3, except in the marginal region 10 that extends beyond the peripheral edge of the inner opening portion between the outer and inner cut or weakening lines, and corresponds to a first pattern defining the first adhesive region (permanent tacky region) 2 to respond to the permanent tackiness feature of the opening and reclosure feature.

The bond/peel force of the first 2 and the second 3 regions can be tuned on demand by the selection of the first adhesive and by the selection and the patterned metered addition of the one or more adhesion promoters. The first adhesive can even be totally passivized into a dead zone where no adhesion remains at all. Such a zone can be used as opening initiation for the reclosable flap.

As far as the outer and inner opening portions are connected by an adhesive having the highest bond/peel strength in the second region 3, they can be lifted out of the plane of the built-in opening as a flap, thereby creating an opening through the packaging structure defined by the inner line of weakness (see FIGS. 1 to 6).

After a first opening, the flap created by the connection of the inner and outer portions can be reclosed by adhering the marginal region 10 of the outer opening portion to the underlying portion of the inner structure 9 via the adhesive with the lowest bond/peel strength in the first adhesive region 2. This permanent tacky adhesive in region 2 can be positioned on the outer or the inner structure (8, 9), by increasing the affinity to it of the underlying substrate via a corona treatment for instance. Both positions having their advantages and drawbacks. Positioned on the inner structure 9, the permanent tacky adhesive in region 2 is often rapidly contaminated by the content of the package, such as confectionary articles or biscuits, etc. Positioned on the outer structure 8, the permanent tacky adhesive in region 2 is possibly passivized by finger contact. The choice of the position of the permanent tacky adhesive (lowest bond/peel strength) is therefore conditioned by the content of the packaging and the requirements of the end-user.

The first adhesive of the present invention may be applied onto the entire surface of the inner structure 9 or of the outer structure 8 by any suitable coating process known to those of ordinary skill in the art, for example by direct gravure coating, reverse gravure coating, offset gravure coating, smooth roll coating, curtain coating, slot coating, spin coating, screen coating, transfer coating, brush or roller coating, air-knife coating, spray coating and combinations thereof. The direct gravure coating process is preferred. Prior to the application of the first adhesive, the surface can be treated by corona discharge or flame treatment to increase the affinity of the surface to the first adhesive.

The thickness of a coated first adhesive layer, preferably provided in liquid form, can be any thickness that results in the desired properties, as is well understood in the art. Exemplary thicknesses may be in the range from about 0.1 to about 20 µm, preferably from about 0.5 to about 15 µm, more preferably from about 1 to 10 µm, and most preferably from about 2 to about 8 µm.

The layer thickness of the first adhesive in the first adhesive region 2 can be higher than the layer thickness of the first adhesive layer in the second adhesive region 3, in order to compensate for the layer thickness of the adhesion promoter contacted to the first adhesive in the second adhesive region 3.

The method for making the flexible laminate of the present invention, comprises the steps of:
providing a first permanent tacky adhesive, preferably a liquid first adhesive, onto the entire surface of the inner structure 9, optionally maintaining adhesive-free regions to create opening-initiation zones;
contacting the first adhesive with one or more adhesion promoters according to the second pattern to form the second adhesive region 3,
laminating the outer structure 8 to the inner structure 9.

The method of the present invention is characterized in that the overall thickness of the first and the second adhesive regions are substantially the same despite a difference in thickness over the section of the laminate web can be contemplated to obtain a higher bond/peel strength in the reclosing area (for example 2.5 g/cm$^2$ for higher bon/peel strength and 4.5 g/cm$^2$ for the reclosing area).

A release-coating layer 4 may be provided, pattern applied onto the inner structure according to a pattern corresponding to the opening initiation 7.

It is obvious that the first adhesive may be applied either on the inner or on the outer structure.

When solvent or water-based first adhesives and/or adhesion promoters are used, drying means such as ovens or infra-red heaters can be used, allowing the applied first adhesive to be in good condition for the next manufacture step (lamination or application of one or more adhesion promoters and/or release-coating).

The inner and the outer structures (8, 9) are preferably supplied from rolls and have substantially the same width. Once laminated face to face, both structures form a laminate that is a continuous web to be supplied to the final packaging station.

One or both of the inner and the outer structures (8, 9) or the adhesively assembled laminate are then scored at a scoring station where an outer score line 5 is formed through the thickness of the outer structure 8 in registration with the outer perimeter of the first region 2 and possibly release-coating layer 4 if an opening initiation 7 is present, and an inner score line 6 is formed through the thickness of the inner structure 9 in registration with the inner perimeter of the first region 2. The score lines (5, 6) can be formed by laser scoring, die cutting or kiss cutting, or any other available method well-known in the art. The position of the scoring station, in case of laser scoring, is principally conditioned by the presence or not of a barrier layer that is able to stop or to reflect the laser beam.

To maintain the outer and inner score lines 5 and 6 in registration around the first region 2 and release layer pattern 4 (outer and inner perimeters of both), the scoring operation is synchronized with the advancement of the laminate by means of an optical sensor detecting an eye mark sequence on the laminate, whose location in relation to first region 2 and release-coating layer 4 pattern is known.

Since tolerances are unavoidable, it is preferable to have the first adhesive region (permanently tacky region) going slightly beyond the outer perimeter of the outer score line 5 than having the second region 3 extending over the outer score line, into the marginal region 10 of the reclosable flap.

In case of laser cutting, the depth and width of the score line can be adjusted by regulating the power output of the beam and the residence time of a given spot on the film surface. These parameters are selected in combination with the material to be scored. Some materials are more receptive than others to laser energy—see for instance U.S. Pat. Nos. 3,909,582 and 5,158,499 giving extensive information on laser-cutting technology.

Furthermore, various combinations of mechanical and laser scoring are possible. One possibility is for instance to laser-score one side of the laminate and to mechanically cut the other side if one of both structures is not laser-scorable, for instance in the case of a non-absorbing seal layer, such as polyethylene without reflective barrier layer behind.

In the final laminate, the outer opening portion bonded by the adhesive in the second adhesive region 3 to the inner opening portion is peelable from the underlying surface of the inner structure 9 allowing both portions to be peeled back and to create a reclosable opening. The marginal region 10 formed between the outer and inner score lines (5, 6) on the outer opening portion (first permanently tacky adhesive region 2) is re-attachable to an underlying surface of the inner structure 9.

The inner structure 9 of the laminate comprises one or more of a sealant or support layer(s) forming the inner surface of the laminate. Sealant layers are well known in the art and comprise heat-seal material such as heat-seal lacquer, LDPE, HDPE, EVA, polypropylene, polyolefin copolymers in general, ionomers or cold-seal materials.

The inner and the outer structures (8, 9) can also comprise one or more barrier layer(s) known in the art such as metallized polyolefin films, for instance metallized oriented polypropylene (oPP), ethylene vinyl alcohol copolymer (EVOH), oriented polyamide (oPA). Other possibilities are ceramic-coated films like AlOx or SiOx—coated polymer films or aluminium foil.

The outer structure comprises one or more of the following layers:
- oriented polypropylene (oPP, 10-100 μm, preferably 15-40 μm);
- high-density polyethylene (HDPE, 10-100 μm, preferably 15 to 40 μm);
- polystyrene (PS, 10-100 μm, preferably 15-40 μm);
- oriented polyamide (oPA, 10-100 μm, preferably 10-40 μm);
- polyester such as polyethylene terephthalate (PET, 10-100 μm, preferably 10 to 40 μm);
- paper.

The second layer of the outer structure 8 can be printed outside or reverse-printed.

All the layers of the inner and outer structures (8, 9) can be laminated by means of adhesives or coextruded with possible tie layer if necessary. The methods for all possible combinations are known in the art.

In the lamination process, the outer structure 8 is provided from a supply roll to a print station for printing graphics and/or indicia on it (not shown). This can be achieved by means of a rotogravure printer. In a preferred embodiment of the invention, the outer structure 8 includes a transparent PET layer that is reverse-printed, which means that the inks are applied to the surface of the PET layer, which is subsequently laminated to another structure, the inks being visible through the outer structure by transparency.

The surface of the outer structure 8 can be treated by corona discharge or flame treatment just prior to printing in the print station or even in an earlier production step. The corona treatment is typically used in the art to render the surface more receptive to the inks. Corona treatment of the outer surface of the inner structure is performed in order to create a privileged affinity to the permanent tacky adhesive region 2 to manage the side where the adhesive has to remain after opening the flap (inner or outer layer).

The present invention is particularly applicable for flexible laminates wherein the inner layer of the outer structure 8 is a metallized or a metal layer.

For the particular case where the first adhesive is applied onto the entire surface of the outer structure, the present invention is particularly relevant for flexible laminates wherein the outer layer of the inner structure 9 is a metallized or a metal layer.

The inner or outer structure is submitted to application stations for first adhesive, adhesion promoter and release coating formulation.

The first adhesive of the present invention comprises one or more polymer(s) and/or oligomer(s), one or more tackifiers and additives for example antioxidants, wetting agents, flowing agents and/or any other additive(s) which are known to those skilled in the art.

The one or more polymer(s) and/or oligomer(s) of the present invention comprise a(n) (meth)acrylate-, rubber-, silicone-, urethane-, ester-, ether-structure or a combination of them.

Polyurethane based polymer(s) and/or oligomers are obtained from reaction of one or more polyols with one or more polyisocyanates. Examples of polyols are polyester polyols, polyesteramide polyols, polyamide polyols, polyether polyols, silicon comprising polyols and rubber polyols.

Rubber-based polymer(s) and/or oligomers are for example polybutadiene-, hydrogenated polybutadiene-; poly(ethylene/butylene)-; butadiene-acrylonitrile-, styrene-butadiene-styrene-, styrene-isoprene-, styrene-ethylene/butylene-styrene- or styrene-ethylene/propylene-styrene based.

Silicone based are for example silane- or siloxane based.

The (meth)acrylic copolymer or oligomer is for example obtained from the polymerization of (meth)acrylate alkyl ester having from 2 to 26 carbon atoms in the alkyl group, such as for example ethyl(meth)acrylate, propyl(meth)acrylate, n-butyl(meth)acrylate, isobutyl(meth)acrylate, among others.

Optionally, the (meth)acrylic copolymer or oligomer comprises one or more ethylenically unsaturated monomer(s) different from (meth)acrylic monomer(s) such as for example styrene, α-methylstyrene, vinyltoluene, acrylonitrile, vinyl acetate, vinyl propionate, acrylamide and vinyl chloride.

Preferably, the polymer(s) and/or oligomer(s) of the present invention comprise functional groups such as hydroxyl- or carboxyl groups obtained from copolimerization of for example (meth)acrylic acid, hydroxyethyl(meth)acrylate or hydroxypropyl(meth)acrylate, which further may be reacted upon application.

The polymers and/or oligomers of the permanently tacky first adhesive may be obtained from the conversion of an adhesive precursor through thermal or irradiation activated reactions.

With "thermal activated", the present invention means crosslinking at room temperature or higher temperatures in general in the presence of one or more crosslinking agents or radical initiators. Typical crosslinkers are blocked and non-blocked isocyanates, carbodiimides, oxiranes, or lower-alkoxylated amino formaldehyde crosslinking agents. Typical radical initiators are azo or peroxy compounds.

When radical initiators are used, ethylenically unsaturated groups are reacted through a radical mechanism.

Said radical reaction also may be performed under the influence of actinic irradiation such as ultra violet of electron beam irradiation. When ultraviolet irradiation is used, one or more photoinitiators and/or photoactivators are added. On the other hand, crosslinking may be performed through a cationic mechanism wherein cyclic ether groups are reacted in the presence of cationic photoinitiators.

The first adhesive of the present invention optionally comprise a mixture of one or more polymers such as for example a mixture of (meth)acrylic copolymers and polyurethanes.

The first adhesive preferably used in the present invention comprises (meth)acrylic (co)polymers.

The (meth)acrylic copolymers are preferably prepared by a dispersion polymerization and are characterized by a weight average molecular weight comprised between 10,000 and 1,000,000 g/mole, preferably between 30,000 and 500,000 g/mole.

The first adhesive of the present invention further comprises one or more tackifiers selected from the group consisting of emulsified rosin, partially decarboxylated rosin, glyceryl esters of polymerised rosin, partially dimerised rosin, natural resins, hydrogenated wood rosin, plasticised hydrogenated rosin, aliphatic and/or cycloaliphatic hydrocarbon resins; aliphatic hydrocarbon resins from petroleum, aromatic petroleum resins, hydrogenated aromatic resins;

mixed aromatic/aliphatic resins, Ethylene Vinyl Acetate copolymers, (meth)acrylate (co)polymers, terpene resins, terpene/phenol resins, cumarone/indene resins, rosin esters, pentaerythritol esters and polydicylopentadiene resins, and modified hydrocarbon tackifier resins.

The first adhesive of the present invention comprises from about 5% to about 80% by weight, preferably from about 15% to about 65% by weight, more preferably from about 20% to about 50% by weight, of one or more tackifier(s).

The first adhesive further comprises from 0% to about 8% of one or more wetting agent(s); from 0% to about 15% of one or more plasticizer(s); from 0% to about 10% of one or more antioxidant(s); from 0% up to about 40% by weight of one or more colorant(s) and from 0% up to about 12% of one or more rheology modifier(s).

The one or more adhesion promoters preferably contacted to the first adhesive of the present invention to form the second adhesive in the second adhesive region 3 is for example a copolymer consisting in polymerized form of:
a) from 20 to 95% by weight, preferably 40 to 90% by weight, more preferably from 70 to 90% by weight, of at least one C2-C20, preferably C2-C10 more preferably C2-C4-olefin; and
b) from 5 to 80% by weight, preferably from 10 to 60% by weight, more preferably from 10 to 30% by weight, of at least one monomer selected from the group consisting of α,β-mono-ethylenically unsaturated C3-C8-monocarboxylic acids, α,β-monoethylenically unsaturated C4-C8-dicarboxylic acids, the anhydrides of these mono- and dicarboxylic acids and vinylacetate.

Preferred olefin monomers for component a) are ethylene and/or propylene and also mixtures of C2-C4-olefins with other olefins for example hexene or octene.

Preference is given to using a copolymer where for at least one monomer b) is selected from the group consisting of α,β-monoethylenically unsaturated C3-C5-monocarboxylic acids, α,β-monoethylenically unsaturated C4-C5-dicarboxylic acids and anhydrides of these mono- and dicarboxylic acids and vinylacetate.

Preference is further given to selecting a monomer b) from the group consisting of acrylic acid, maleic acid, maleic anhydride and vinylacetate.

Particularly preferred copolymers are ethylene-acrylic acid copolymers and ethylene vinylacetate copolymers.

The adhesion promoters in general have a number average molecular weight comprised between 10,000 and 50,000 g/mole and preferably between 15,000 g/mole and 30,000 g/mole and in general are prepared by emulsion polymerization.

A particularly advantageous adhesion promotion is achieved when the above olefin copolymers comprise at least one polymer selected from the group consisting of polyurethanes and butadiene-styrene, butadiene-acrylonitrile, butadiene-acrylonitrile-styrene, (meth)acrylic ester-styrene, (meth)acrylic ester-vinyl acetate, methacrylic ester-acrylic ester, (meth)acrylic ester-styrene-acrylonitrile copolymers the (meth)acrylic esters being preferably the esters of C1-C8-alkanols, in particular of n-butanol, 2-ethylhexanol, methanol and ethanol.

One or more adhesion promoters preferably are provided to the first adhesive in an amount ranging from 1 to 50% by weight, preferably from 3 to 35% by weight, more preferably from 5 to 25% by weight, of the total weight of the one or more polymer(s) and/or oligomer(s) and adhesion promotors.

The first adhesive region 2 forms viscoelastic bonds that are permanently tacky and adhere under simple finger pressure.

The first adhesive and release-coating layer 4 applying stations (12, 13) are complemented by drying means such as ovens or infra-red heater for instance, allowing the applied adhesives to be in good condition for the next manufacture step (application of adhesion promoter, lamination . . . ).

The flexible laminate of the invention comprising a built-in open and reclose feature made as in the invention provides a tamper-evidence function because it is very difficult to replace the opening portions after initial opening exactly on the same place as before the opening. When the outer layer of the outer structure 8 is printed, in particular if it is reverse printed, it is almost impossible to achieve perfect registration of the printed matter across the score line when reclosing the package. Alternatively, a tamper-evidence function is provided through an interruption of the inner and/or outer score line (no score line at the interruption), so that after initial opening, the inner and/or outer structure are partially damaged at said interruption through which the first opening of the flap is clearly visible.

Figure 5:
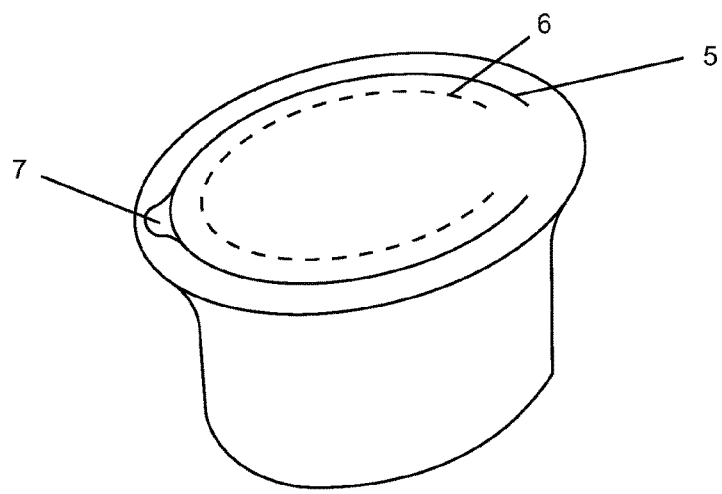
FIGS. 5 and 6 show a tray comprising a built-in opening and reclose arrangement according to the invention on its lid. The first adhesive region and the release-coating region or adhesive-free region on the opening initiation, the permanently tacky adhesive remaining on the outer structure after opening.
Figure 6:
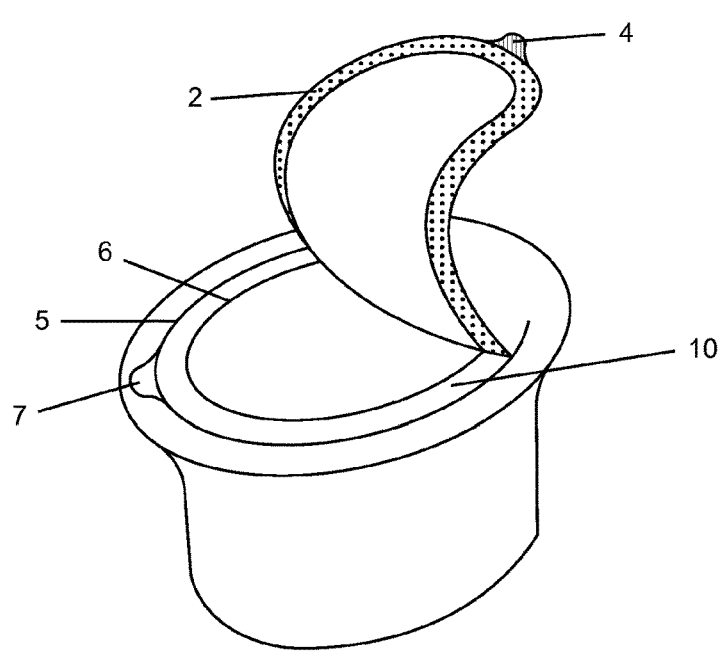

The flexible laminate of the invention not only can be used for flow packs or pouches (FIGS. 3 and 4) but also for lidding of tray or other container (FIGS. 5 and 6). In this manner, the lid includes a built-in reclosable opening.

EXAMPLES

The following illustrative examples are merely meant to exemplify the present invention but are not destined to limit or otherwise define the scope of the present invention.

Figure 8:
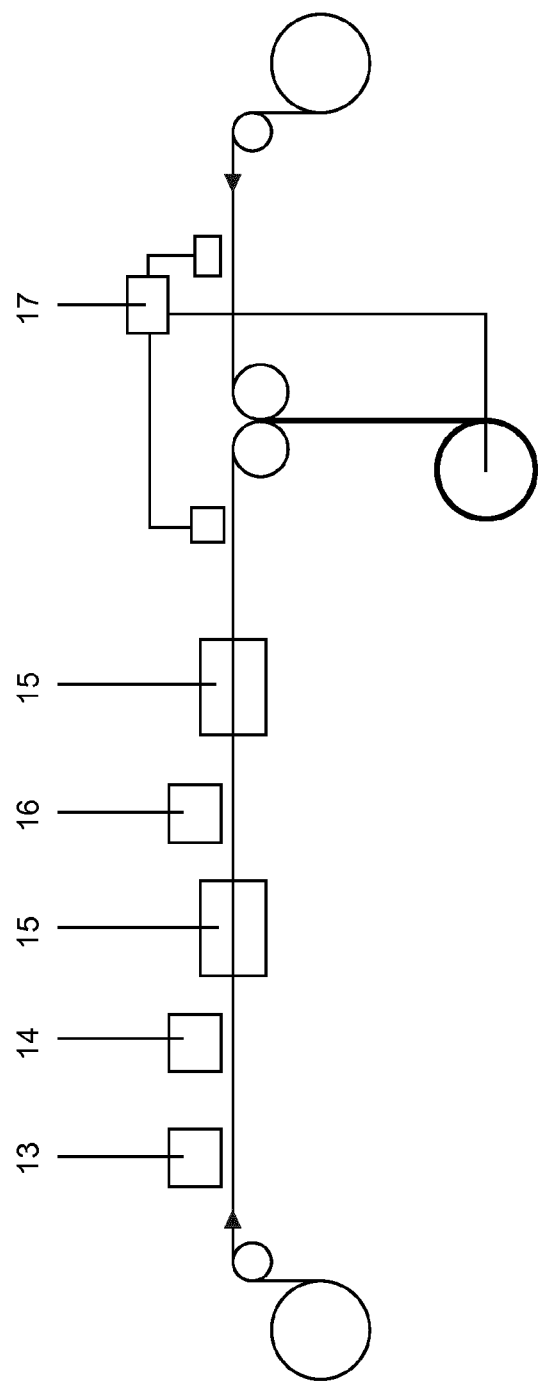
FIG. 8 represents a side view of the lamination arrangement.

Example 1 to 3 correspond to the embodiments as shown in FIG. 8 and was performed under the following conditions:
Duplex Structure Example 1

A structure of a white pigmented, oriented polypropylene film (WTD from Treofan Germany GmbH & Co. KG) was printed by means of solvent containing polyvinylbutyral colors (PVB from Siegwerk Druckfarben AG & Co. KGaA). A protection layer of polyamide (Release lacquer 10-609345-3 of Siegwerk Druckfarben AG & Co. KGaA) was then applied on the printed surface.

First adhesive Acronal DS 3609 (BASF) was then applied at a film thickness of 5 µm over the entire surface of the print-free side of the propylene film except for the opening initiation region.

Figure 2:
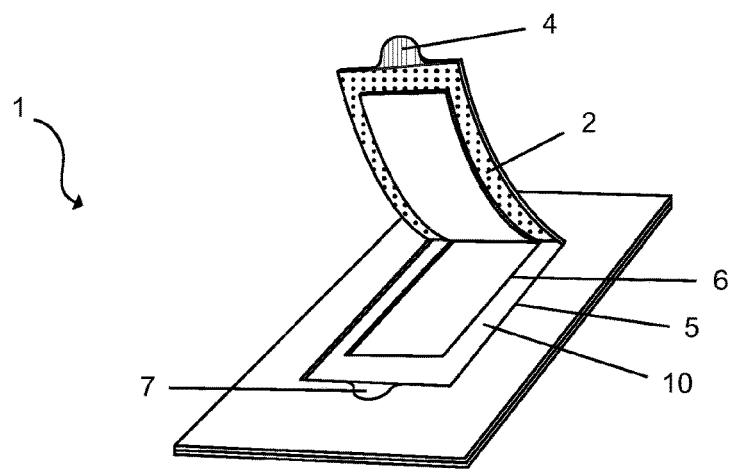
FIG. 2 is a view of the built-in opening and reclose feature with a first adhesive region and a release-coating region or adhesive-free region on the opening initiation (grasping portion), the permanently tacky adhesive remaining on the outer structure (flap) of the laminate after opening.
Figure 3:
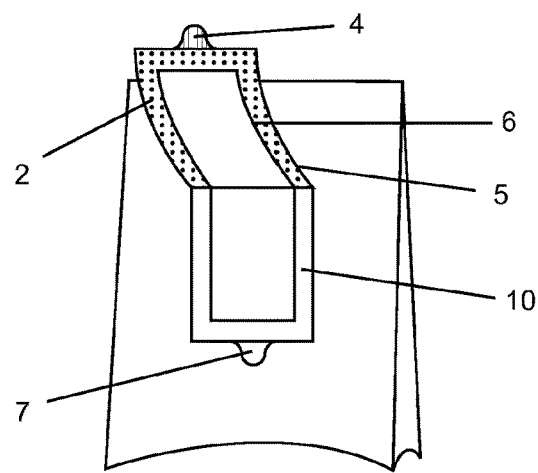
FIG. 3 is a view of a standing pouch comprising a built-in opening and reclose feature according to the invention, with the first adhesive region and the release-coating region or adhesive-free region positioned on the opening initiation, the permanently tacky adhesive remaining on the outer structure after opening.
Figure 4:
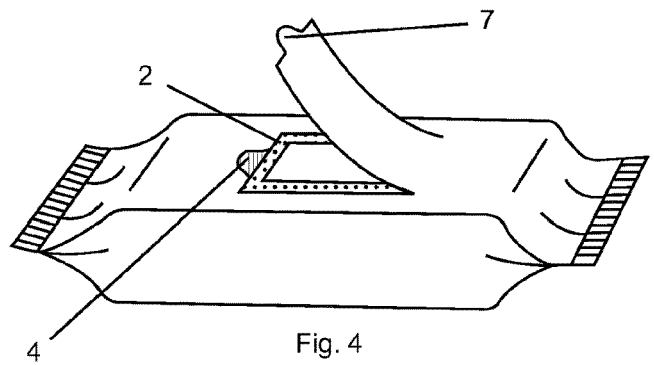
FIG. 4 is a view of a flow pack comprising a built-in opening and reclose feature according to the invention, with the first adhesive region and the release-coating region or adhesive-free region positioned on the opening initiation, the permanently tacky adhesive remaining on the inner structure after opening.

Polygen WE 3 (BASF) was then contacted to the first adhesive Acronal DS 3609 in an amount of 1.7 g/m² over the entire surface of the first adhesive except for the U-shaped patterns (FIGS. 1 to 3).

Subsequently, a metallized foamed polypropylene film (QCM from Treofan Germany GmbH & Co. KG) was then adhesive laminated, with the metallized side contacting the adhesive, to create a duplex structure.

After a dwell time of 200 hours at room temperature and after laser perforation, the bond/peel strength was measured for the first adhesive region comprising a layer of Acronal DS 3609 and for the second adhesive region comprising a layer of Acronal DS 3609 wherein part of said layer was converted into a layer comprising a mixture of Acronal DS 3609 and Polygen WE 3.

The bond/peel strength corresponding to the first adhesive regions was 1.3 N/15 mm and permanently tacky, while the bond/peel strength corresponding to the second adhesive region was 2.1 N/15 mm, according to a T-peel geometry at a speed of 100 mm/min and room temperature.

On the backside of the metallized foamed polypropylene, a further cold seal (Naturlex Kautschuk Emulsion—Cold seal S 8085 von Sun Chemical) was pattern applied for the cross and longitudinal seal of the future pack (not represented).

Example 2

To the oriented polypropylene film structure comprising first adhesive as in example 1, was contacted 1.5 g/m² Polygen WE 3 as in example 1

A polyethylene film was then adhesive laminated to create a duplex structure with the non-corona treated surface in contact with the adhesives. After a dwell time of 200 hours and after laser perforation, the bond/peel strength corresponding to the first adhesive regions, comprising Acronal DS 3609, was 0.6 N/15 mm, while the bond/peel strength corresponding to the second adhesive region, comprising a layer of Acronal DS 3609 wherein part of said layer is converted into a layer comprising a mixture of Acronal DS 3609 and Polygen WE 3, was 2.9 N/15 mm, according to a T-peel geometry at a speed of 100 mm/min and room temperature. In a subsequent experiment, the bond/peel strength of the first adhesive regions was measured after consecutive de-attaching/attaching cycles. After five cycles, a 40% decrease of the original bond/peel strength value was measured.

Example 3

To the oriented polypropylene film structure as in example 1, Acronal N-286 (BASF) was applied as in example 1 at a film thickness of 5 μm.

After flashing off the water in an infrared over, Adcote 37P295 (DOW) is applied at 2.5 g/m² over the entire surface of the adhesive precursor except for the U-shaped patterns (FIGS. 1 to 3).

A metallized polyethylene terephthalate film was then adhesive laminated, with the metallized side contacting the adhesive, to create a duplex structure. After a dwell time of 200 hours and after laser perforation, the bond/peel strength corresponding to the permanently tacky first adhesive regions, comprising Acronal N-286, was 1 N/15 mm, while the bond/peel strength corresponding to the second adhesive region, comprising a layer Acronal N-286 wherein part of said layer is converted into a layer comprising a mixture of Acronal N 286 and Adcote 37P295, was 2.0 N/15 mm, according to a T-peel geometry at a speed of 100 mm/min and room temperature.

Laser Perforation (ROFIN-BAASEL Lasertech Equipment)

The laser perforation of the duplex structure can performed according to numerous embodiments, depending on the available laser equipment.

Preferred embodiments are:
  cut inline on both sides of the duplex laminate structure;
  separately cut inline the first and second structures before both structures are adhesive laminated to a duplex structure;
  cut inline one of both structures before the adhesive lamination of both structures followed by the adhesive lamination step and then by the cut of the second structure.

After laser cut of the duplex structure to create the built-in opening and reclose feature for the reclosable packaging of the present invention, the duplex structure is cut into the right width and wound on rolls with the printed layer oriented outside.

All examples can additionally be equipped on the duplex structure with a cold seal on specific positions to seal the finished pack. The used cold seal is S 8085 of Sun Chemical (this step is not represented in the figures).

The invention claimed is:

1. A flexible laminate for forming a reclosable packaging container comprising a built-in opening and reclose feature, said laminate comprising an inner structure and an outer structure, adhesively joined face-to-face, the outer structure forming the outer surface of the container and the inner structure forming the inner surface of the container, the outer structure comprising an outer flap portion delimited by a scoring line through the outer structure, and an inner structure comprising an inner flap portion delimited by a scoring line through the inner structure, the inner score line and the outer score line creating an opening into the container when the flap portions are peeled back, a marginal region of the outer flap portion extending beyond an edge of the inner flap portion and overlying an underlying surface of the inner structure, the inner and outer flap portions being joined in a second adhesive region and the first adhesive region being disposed between the marginal region of the outer flap portion and the underlying surface of the inner structure for attaching and re-attaching, in use, the outer flap portion to the underlying surface, wherein the bond/peel strength, measured according to ASTM F904-1998 (reapproved 2008), of the first adhesive is smaller than the bond/peel strength of the second adhesive, the first adhesive being permanently tacky and covering the entire surface of either the inner structure or the outer structure, said first adhesive being patterned covered by an adhesion promoter, transforming said first adhesive into a second adhesive and creating patterns of first adhesive region and second adhesive region.

2. The flexible laminate as in claim 1, wherein the adhesive comprises one or more (meth)acrylate copolymers or one or more polyurethane resins.

3. The flexible laminate as in claim 1, wherein the adhesion promoter is a copolymer of at least one C2-C20 alkene and at least one α, β-monoethylenically unsaturated mono- or dicarboxylic acid or vinyl acetate.

4. The flexible laminate as in claim 1, wherein the adhesion promoter is an ethylene acrylic acid copolymer or an ethylene vinyl acetate copolymer.

5. The flexible laminate as in claim 1, wherein one of the inner or outer structures (8, 9) of the laminate comprises an adhesive-free region adjacent to the first adhesive region (2) to create an opening-initiation zone (7).

6. The flexible laminate as in claim 1, wherein one of the outer or inner structures has a greater affinity for bonding to the adhesive in the first adhesive region such that the adhesive remains entirely with one of the outer or inner structures when the flap portions are peeled back.

7. The flexible laminate as in claim 1, wherein the outer structure includes a layer that is reverse-printed on a surface of the layer facing the inner structure.

8. The flexible laminate as in claim 1, wherein the inner structure includes a barrier layer providing a barrier against passage of at least one of moisture and oxygen.

9. The flexible laminate as in claim 1, wherein the outer structure comprises a layer of polyethylene terephthalate or oriented polypropylene and the inner structure comprises
  a multi-layer web comprising a metallized polymer film, or
  a heat-sealable multilayer web.

10. A reclosable packaging comprising the flexible laminate as in claim 1.

11. The flexible laminate as in claim 1, wherein the outer structure comprises a layer of polyethylene terephthalate or oriented polypropylene and the inner structure comprises
a multi-layer web comprising a metallized polymer film in the form of a metallized oriented polypropylene and a heat-sealable material, or
a heat-sealable multilayer web in the form of a heat-sealable metallized oriented polypropylene.

12. The flexible laminate of claim 1, wherein the bond/peel strength of the second adhesive region is at least 0.5 N/15 mm, the bond peel strength being measured according to a T-peel geometry at a speed of 100 mm/min and at room temperature.

13. The flexible laminate of claim 12, wherein the bond/peel strength of the second adhesive region is at least 1.0 N/15 mm higher than the bond/peel strength of the first adhesive region.

14. The flexible laminate of claim 12, wherein the bond/peel strength of the second adhesive region is at least 1.5 N/15 mm, higher than the bond/peel strength of the first adhesive region.

15. The flexible laminate as in claim 1, wherein the bond/peel strength of the first adhesive region is lower than 1.3 N/15 mm, and the bond/peel strength obtained in the second adhesive region is higher than 1.5 N/15 mm, where the peel force represents the tear strength of one of the substrate layers, the values being measured according to a T-peel geometry at a speed of 100 mm/min and room temperature.

16. The flexible laminate as in claim 15, wherein the bond/peel strength of the first adhesive region is lower than 1.1 N/15 mm, and the bond/peel strength obtained in the second adhesive region is higher than 1.6 N/15 mm.

17. The flexible laminate as in claim 15, wherein the bond/peel strength of the first adhesive region is lower than 0.9 N/15 mm, and the bond/peel strength obtained in the second adhesive region is higher than 1.8 N/15 mm.

18. The flexible laminate as in claim 15, wherein the bond/peel strength obtained in the second adhesive region is higher than 3.0 N/15 mm.

19. The flexible laminate as in claim 1, wherein the adhesion promoter is a copolymer comprising:
from 20 to 95% by weight, of at least one C2-C20-olefin; and
from 5 to 80% by weight of at least one monomer selected from the group consisting of α, β-mono-ethylenically unsaturated C3-C8-monocarboxylic acids, α, β-mono-ethylenically unsaturated C4-C8-dicarboxylic acids, the anhydrides of these mono- and dicarboxylic acids and vinylacetate.

20. The flexible laminate as in claim 19, wherein the adhesion promoter being the copolymer comprises:
from 40 to 90% by weight of at least one C2-C20-olefin; and
from 10 to 60% by weight of at least one monomer selected from the group consisting of α, β-mono-ethylenically unsaturated C3-C8-monocarboxylic acids, α, β-monoethylenically unsaturated C4-C8-dicarboxylic acids, the anhydrides of these mono- and dicarboxylic acids and vinylacetate.

21. The flexible laminate as in claim 19, wherein the adhesion promoter being the copolymer comprises:
from 70 to 90% by weight, of at least one C2-C20-olefin; and
from 10 to 30% by weight, of at least one monomer selected from the group consisting of α, β-mono-ethylenically unsaturated C3-C8-monocarboxylic acids, α, β-monoethylenically unsaturated C4-C8-dicarboxylic acids, the anhydrides of these mono- and dicarboxylic acids and vinylacetate.

22. The flexible laminate as in claim 19, wherein the at least one C2-C20-olefin comprises at least one C2-C10-olefin.

23. The flexible laminate as in claim 19, wherein the at least one C2-C20-olefin comprises at least one C2-C4-olefin.

24. A method for preparing the flexible laminate according to claim 1 comprising the steps of:
applying a layer of first permanently tacky adhesive onto one surface of the inner or outer structure;
patterned contacting said first adhesive and creating patterns of first and second regions, the first adhesive region having a lower bond/peel strength than the second adhesive region and the first adhesive region being permanently tacky;
scoring the inner and outer structures by a scoring station before or after adhesively joining the inner structure to the outer structure face to face to form the laminate, an outer score line being formed through the thickness of the outer structure in registration with the outer perimeter of the first adhesive region, and an inner score line being formed through the thickness of the inner structure in registration with the inner perimeter of the first adhesive region.

25. The method as in claim 24, wherein the second adhesive region and the first adhesive region are patterned, and wherein the position of the opening initiation is covered by a release layer or wherein the position of the opening initiation is adhesive-free.

26. The method as in claim 24, wherein the patterned conversion of first adhesive into second adhesive, in the second adhesive region, is obtained through the patterned contacting one or more adhesion promoters to the first adhesive in the second adhesion region.

27. The method as in claim 24, further comprising the step of treating one surface of the outer or inner structure with a corona or flame treatment to increase the bonding affinity with the first adhesive region such that the first adhesive tends to remain adhered to the treated surface when the opening portions are peeled back.

* * * * *